United States Patent [19]

Reibetanz et al.

[11] 4,250,971
[45] Feb. 17, 1981

[54] PARTICULATE MATERIAL INTERCEPTING ARRANGEMENT FOR A HAND-HELD TOOL

[75] Inventors: Wilbert Reibetanz, Leinfelden; Horst Sigg, Stuttgart; Herbert Wiesner, Leinfelden; Karl Wanner, Echterdingen; Gernot Hänsel, Stuttgart; Karl Seitz, Filderstadt; Manfred Bleicher, Leinfelden, all of Fed. Rep. of Germany

[73] Assignee: Robert Bosch GmbH, Stuttgart, Fed. Rep. of Germany

[21] Appl. No.: 56,101

[22] Filed: Jul. 9, 1979

Related U.S. Application Data

[62] Division of Ser. No. 863,164, Dec. 22, 1979, abandoned.

[30] Foreign Application Priority Data

Feb. 9, 1977 [DE] Fed. Rep. of Germany ....... 2705410

[51] Int. Cl.³ .............................................. B23B 45/14
[52] U.S. Cl. ...................................... 173/21; 175/40; 175/209; 408/16
[58] Field of Search ............................ 173/21; 408/16; 145/129; 175/40

[56] References Cited

U.S. PATENT DOCUMENTS

| | | | |
|---|---|---|---|
| 2,483,060 | 9/1949 | Niedelman et al. | 145/219 |
| 3,242,773 | 3/1966 | Praag | 408/16 |
| 3,456,740 | 7/1969 | Paul et al. | 173/21 |
| 3,537,336 | 11/1970 | Schmnel | 173/21 |
| 3,633,682 | 1/1972 | Moores, Jr. | 173/21 |

FOREIGN PATENT DOCUMENTS 2306040 8/1974 Fed. Rep. of Germany ............. 408/16

*Primary Examiner*—William F. Pate, III
*Attorney, Agent, or Firm*—Michael J. Striker

[57] ABSTRACT

A dust-intercepting member is so mounted on a hand-held power tool as to contact a structure being acted upon around the tool element of the power tool, by a mounting arrangement which includes two hollow elongated mounting members one of which is received within the other for telescoping relative thereto while being retained against rotation with respect to the other mounting member about the common axis of the mounting members, and a helical compression spring the ends of which are respectively received in the interiors of the mounting members and urge the latter in opposite directions. The other mounting member is attached to an auxiliary hand grip which, in turn, is mounted on a cylindrical extension of the housing by a quick-release clamping arrangement. A setting ring on the inner one of the mounting members determines the depth of penetration of the tool element into the structure. A depth-determining profiled rod is displaceably and arrestably mounted on the auxiliary hand grip. The outer one of the mounting members is connected to the profiled rod when the intercepting arrangement is mounted on the auxiliary hand grip.

6 Claims, 10 Drawing Figures

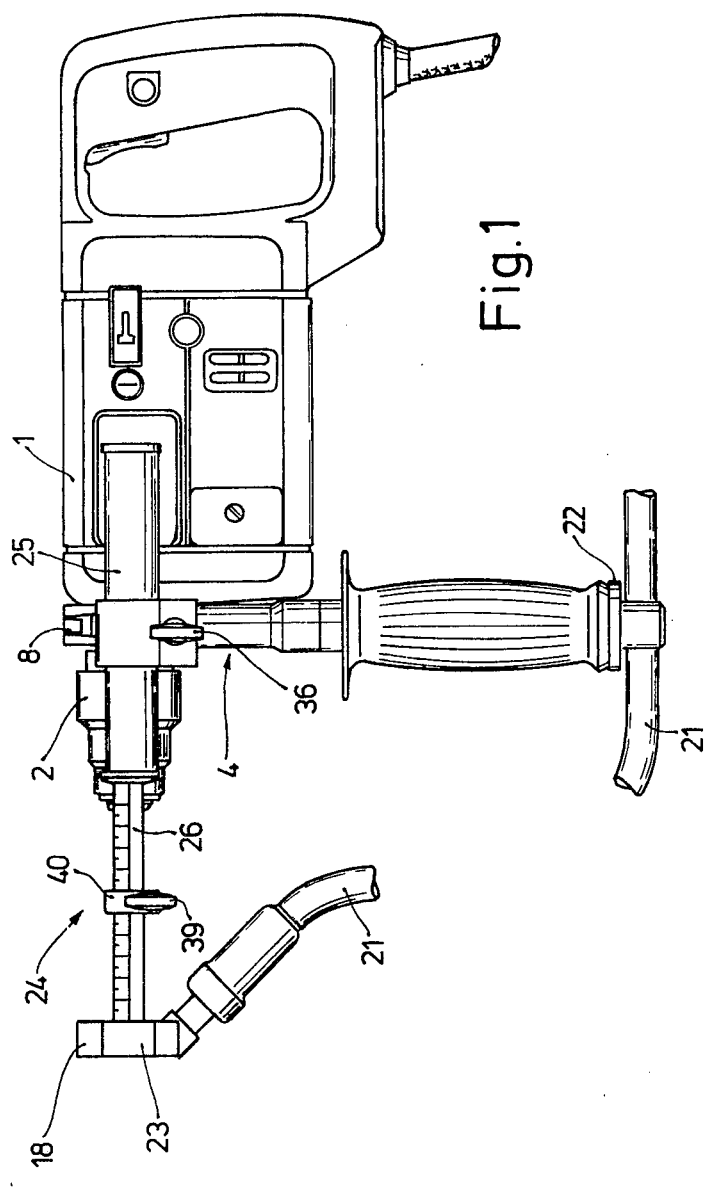

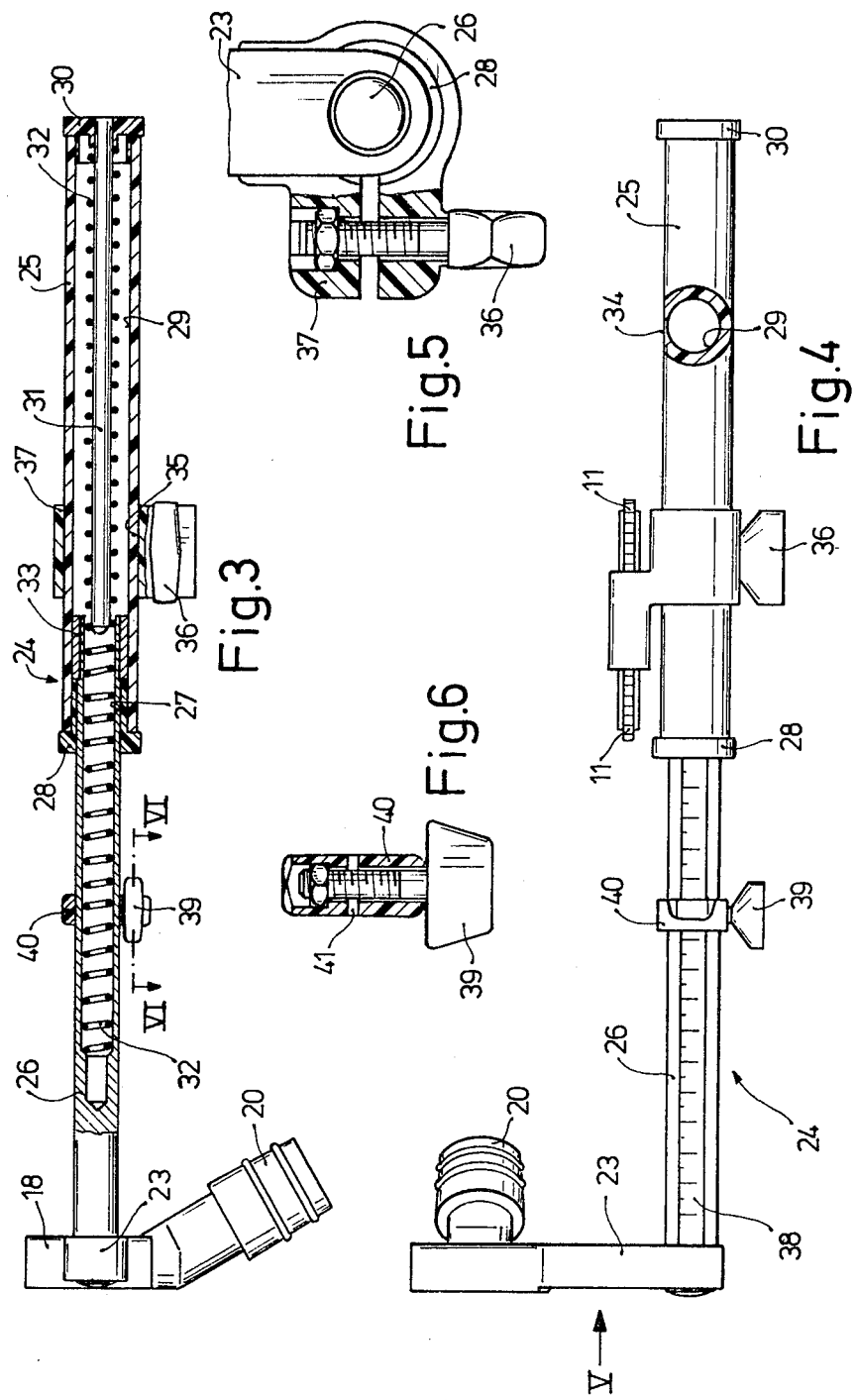

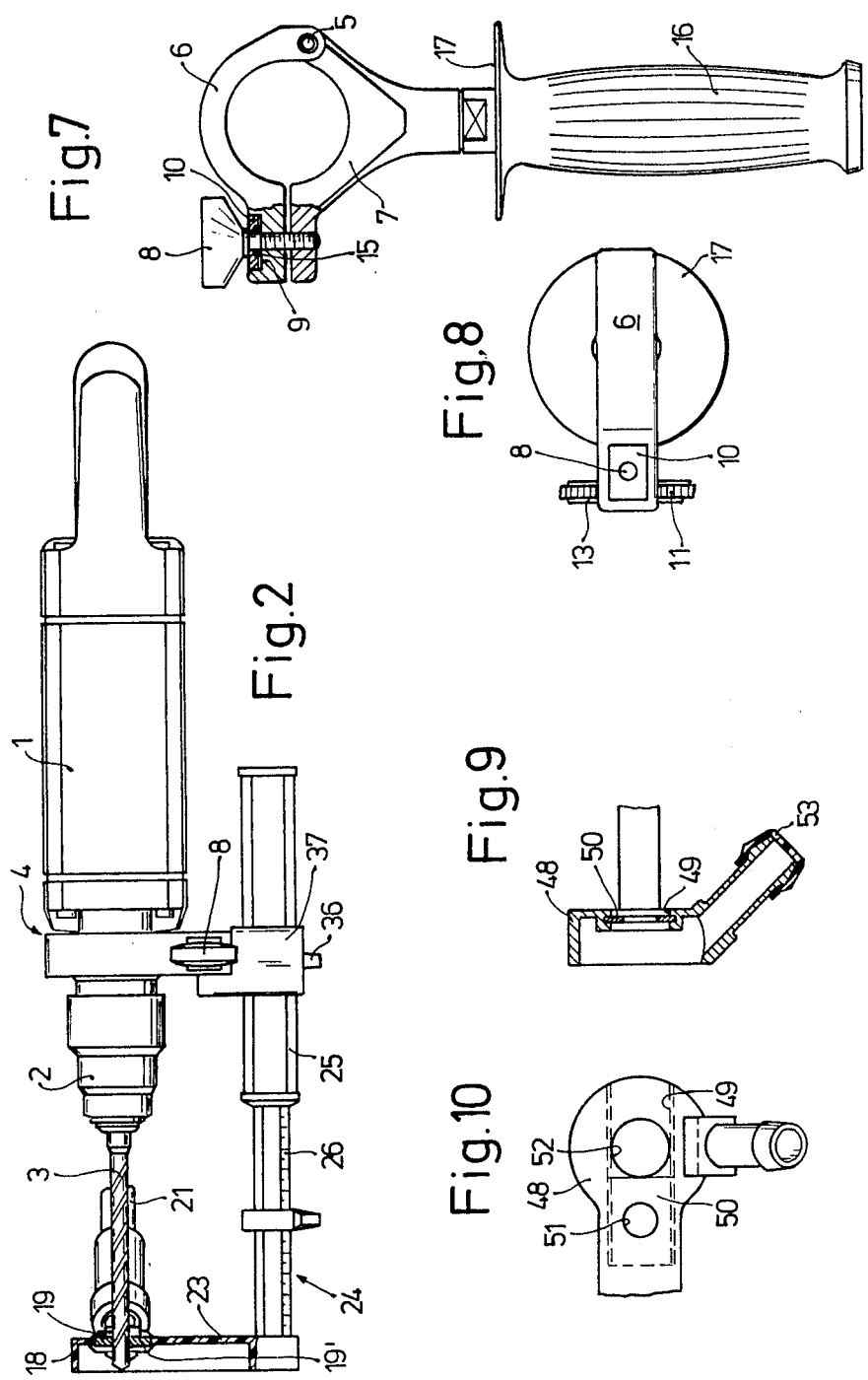

PARTICULATE MATERIAL INTERCEPTING ARRANGEMENT FOR A HAND-HELD TOOL

This is a division of application Ser. No. 863,164, filed Dec. 22, 1979, now abandoned.

BACKGROUND OF THE INVENTION

The present invention relates to an arrangement for intercepting particulate material removed by a tool element from a structure in general, and more particularly to such an arrangement for use on hand-held power tools.

There are already known various arrangements which are capable of intercepting and/or withdrawing particulate material from the vicinity of the leading end portion of a tool element of a hand-held power tool which acts on a structure in such a manner that the particulate material is dissociated from the structure. In one of such conventional dust-intercepting or dust-withdrawing arrangements, there is provided a trough-shaped intercepting container which covers the working area of the structure acted upon by a drill clamped in the power tool. The drill of the power tool extends through an opening which is provided in a raised portion of a bottom of the intercepting receptacle, the raised portion surrounding the drill with a spacing therefrom. The intercepting receptacle of this conventional arrangement is mounted on the housing of the power tool for shifting parallel to the power tool element by means of two telescopically extendable rods. A connecting nipple is provided at the lower end of the intercepting receptacle, and a flexible hole is connected to the connecting nipple, the hose communicating with a separately arranged suction source. This conventional arrangement is quite suited for the intended purpose that is, for intercepting and withdrawing the particulate material which is dissociated by the drill from the structure. However, this arrangement is also disadvantageous in some respects. First of all, the mounting arrangement for the intercepting receptacle which consists of two rods, is bulky and quite difficult to operate. In addition thereto, the rods of this mounting arrangement, more often than not, hinder the user of the power tool equipped with the intercepting receptacle in observing the working location. From the operational viewpoint this arrangement is disadvantageous in that the springs, which urge the intercepting receptacle away from the housing of the power tool, that is, toward its initial position, which springs are mounted on the rods of the mounting arrangement, exert a progressively increasing biasing force as the rods of the mounting arrangement are being gradually telescopically collapsed. This results not only in premature tiredness of the operator, but also in a situation where fine determination of the depth and speed of penetration of the tool into the structure is all but rendered impossible.

SUMMARY OF THE INVENTION

Accordingly, it is a general object of the present invention to avoid the disadvantages of the prior art.

More particularly, it is an object of the present invention to develop a mounting arrangement for a dust-intercepting receptacle to be used on hand-held power tools, which is not possessed of the disadvantages of the prior-art mounting arrangements of this type.

A further object of the present invention is to so design the mounting arrangement as to constitute only a minimum hindrance to the user of the power tool used in conjunction with the intercepting receptacle.

A still another object of the present invention is to so construct the mounting arrangement that the spring thereof will have a substantially linear characteristic within the operating range.

A concomitant object of the present invention is to provide a mounting arrangement for a dust-intercepting receptacle which is simple in construction, low in weight, easy to connect to and disconnect from the power tool and operate, and reliable nevertheless.

In pursuance of these objects and others which will become apparent hereafter, one feature of the present invention resides in an arrangement for intercepting particulate material removed by a tool element, particularly a drill, of a hand-held tool from a structure, briefly stated, in a combination comprising an intercepting member having an open end and a closed end having an opening therethrough; means for mounting said intercepting member on the tool so that the tool element passes through said opening and, in use, said open end of said intercepting member contacts the structure about the tool element and for retrogressive displacement from an initial position in which said intercepting member surrounds a leading end portion of the tool element to a terminal position in which the leading end portion of the tool element extends axially beyond the intercepting member, including two elongated hollow mounting members one of which is telescopically received in the other and both of which extend parallel to the tool element; and means for urging said intercepting member toward said initial position thereof including a compression spring having ends which are respectively received in the interiors of, and which act in opposite directions on, said mounting members. Advantageously, the arrangement of the present invention further comprises means for blocking the mounting members against rotation relative to one another including a non-circular outer periphery of the one mounting member, and a correspondingly configurated guide aperture in the other mounting member. Preferably, the guide aperture is provided in a guide member which is separate from and rigidly connected to the other mounting member.

In a currently preferred embodiment of the present invention, a guide rod is coaxially connected to the other mounting member and penetrates therefrom into the interior of one of the ends of the compression spring, the other end of the compression spring being closely surrounded by a tubular wall of the one mounting member. In this respect, it is advantageous when the other tubular member includes a tubular component and a closing component connected to the tubular component at the end thereof which faces away from the one mounting member, and if the guide rod is mounted on the closing component.

Advantageously, the mounting means further includes a split clamping member embracing the other mounting member and attached to the tool and a clamping screw for contracting the clamping member around the other mounting member. In this connection it is advantageous for the other mounting member to have a non-circular outer contour, and for the clamping member to have a compatible inner contour.

According to a further advantageous concept of the present invention, a profiled rod is so rigidly connected to the clamping member as to extend parallel to the tool element, and a holding member is connected to the tool and has the profiled rod of the clamping member connected thereto. Advantageously, the profiled rod is a depth-determining rod, the holding member is an auxiliary hand grip of the tool, and the profiled rod is received in a through bore of the auxiliary hand grip. It is further advantageous for the one mounting member to have an adjustment scale thereon. Furthermore, it is advantageous when the one mounting member has a depth-determining slotted ring mounted thereon for movement longitudinally thereof, the slotted ring having an inner surface of a configuration compatible with that of the outer periphery of the one mounting member and carrying a setting screw which contracts the slotted ring around the one mounting member when tightened.

Another advantageous facet of the present invention resides in the fact that the mounting means further includes a bracket which is connected to the intercepting member and mounted on a free end portion of the one mounting member which is remote from the other mounting member, in a cantilevered fashion. Advantageously, the bracket is an integral part of the intercepting member, the latter being generally cup-shaped. Then, means may be provided for communicating the interior of the intercepting member with a subatmospheric pressure source, including a nipple on the intercepting member. A hose mounted on the nipple may be supported on an auxiliary hand grip connected to the tool by a holding ring affixed to a free end portion of the auxiliary hand grip.

An especially advantageous embodiment is obtained when the above-mentioned slotted ring, the other mounting member and the intercepting member are of a low-weight material, such as a glass-fiber-filled polyamide. Furthermore, it is advantageous when the one mounting member is of a low-weight metal, particularly aluminum. It is particularly advantageous when the one mounting member is of a stock material, particularly of such material which has a hexagonal cross-section at the outer periphery thereof.

According to a further development of the basic concept of the present invention, a wear-resistant annular insert is arranged in the above-mentioned opening of the closed end of the intercepting member about the tool which passes through the opening. The insert is preferably of a hard material, such as hardened steel.

A further advantageous aspect of the present invention provides for an aperture plate which has at least one aperture of a diameter which is smaller than that of the above-mentioned opening, the aperture plate being guided on the intercepting member for displacement between an inactive position in which the aperture plate uncovers the opening, and an active position in which the aperture of the aperture plate is in coaxial register with the opening. Advantageously two tracks are provided in the closed end of the intercepting member which guide the aperture plate for the above-mentioned displacement.

According to a further, especially advantageous concept of the present invention, a hand-held power tool has a housing which includes a cylindrical extension, and an auxiliary hand grip which has a body portion and means for mounting the body portion on the housing, including two shell-shaped clamping members one of which is rigidly connected to the body portion and both of which together bound a passage for clampingly receiving the cylindrical extension of the housing, a pivot which connects the clamping members to each other at one side of the passage for relative pivoting between an open releasing position and a closed clamping position, and a clamping screw which is so connected to the clamping members at the opposite side of the passage as to displace the clamping members into the clamping position when being tightened. In this context, it is advantageous when a profiled rod is held on the auxiliary hand grip in a plurality of positions by holding means which is also operated by the clamping screw at least in the clamping position of the clamping members for arresting the profiled rod in the then assumed position thereof relative to the hand grip. The profiled rod may be the above-mentioned depth determining rod which is then mounted on the hand grip for longitudinal displacement parallel to the extension of the housing, and thus parallel to the axis of the tool element of the power tool.

It is further proposed, according to an advantageous aspect of the present invention for the above-mentioned holding means to include a through bore in one of the clamping members, the through bore having a cross-sectional shape corresponding to that of the profiled rod. Then a holding plate is mounted on the clamping screw and penetrates into the through bore in the clamping position of the clamping members to reduce the cross-sectional shape of the through bore and thus clamp the profiled rod between the latter and itself. In this context it is further proposed that the one clamping member have a cutout for receiving the holding plate. Then, the holding plate has a central opening through which the clamping screw passes freely, and the other clamping member has a tapped bore therein into which the clamping screw is threaded to draw the clamping members together during tightening of the clamping screw. Mutually engaging corrugations are provided at the facing engagement surfaces of the profiled rod and of the holding plate. Advantageously, the corrugations extend transversely of the direction of displacement of the profiled rod between the positions thereof.

Moreover, it is further advantageous when an elastic ring is interposed between the one clamping member and the engagement surface of the holding plate, in that the elastic ring, such as an O-ring, urges the holding plate away from the profiled rod upon loosening of the clamping screw. The body portion of the auxiliary hand grip is at least partially of an insulating material and has a protective collar at the end thereof which is closer to the housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side elevational view of a power tool equipped with an arrangement for intercepting and withdrawing particulate material according to the present invention;

FIG. 2 is a top elevational view of FIG. 1;

FIG. 3 is a partial longitudinal section of the arrangement for intercepting and withdrawing particulate material according to FIG. 1;

FIG. 4 is a top elevational view of FIG. 3;

FIG. 5 is a front elevational view taken in the direction of the arrow V in FIG. 4;

FIG. 6 is a sectional view taken on line VI—VI of FIG. 3;

FIG. 7 is a side elevational view of an auxiliary hand grip;

FIG. 8 a top elevational view of FIG. 7;

FIG. 9 a cross-sectional view of a modified version of an intercepting receptacle for the particulate material; and FIG. 10 is a side elevational view of the receptacle taken in the direction of the arrow X of FIG. 9.

DETAILED DISCUSSION OF THE PREFERRED EMBODIMENTS

Referring now to the drawing in detail, and first to FIGS. 1 and 2 thereof, it may be seen therein that the reference numeral 1 has been used to designate a power tool, such as a hammer drill, in toto. The power tool 1 has a tool-receiving chuck 2 at one of its ends. A tool element 3, illustrated in the drawing as a drill, is replaceably clamped in the chuck 2.

The housing of the power tool has a cylindrical extension 1a, the extension 1a, for instance, accommodating a bearing for a driving spindle which is accommodated within the power tool 1 and carries the chuck 2.

Auxiliary hand grip 4 is mounted on the extension 1a by means of shell-shaped clamping members 6 and 7 which, as illustrated particularly in FIGS. 7 and 8, are connected to one another by means of a pivot 5. Thus, the clamping members 6 and 7 are pivotable relative to one another between a closed position in which the clamping members 6 and 7 embrace and clampingly engage the extension 1a and an open disengaging position. A clamping screw 8 is located at the opposite side of the clamping members 6,7 from the pivot 5, and serves to contract the clamping members 6 and 7 to clamp the extension 1a therebetween.

A through aperture 9, for instance, of a hexagonal cross section is provided in the upper shell-shaped clamping member 6, and serves to accommodate and hold a profiled rod 11 such as, for instance, a depth-determining rod. An insert plate 10 is so mounted on the clamping members 6 and 7 as to be capable of penetrating into and thus reducing the cross-section of the through hole 9. The insert plate 10 has a through aperture therein and the clamping screw 8 extends through this aperture of the insert plate 10 and is threaded into a tapped bore of the lower shell-shaped clamping member 7 to urge the two clamping members 6, 7 towards each other about the pivot 5 during the tightening of the clamping screw 8.

That surface of the insert plate 10 which contacts the profiled rod 11, as well as that surface 12 of the profiled rod 11 which faces the insert plate 10, are provided with corrugations 13 extending transversely of the direction of movement of the profiled rod 11, as best seen in FIG. 8. The insert plate 10 is accommodated in a corresponding recess of the upper shell-shaped clamping member 6. An elastic ring 15, such as an O-ring, is arranged at the clamping screw 8 the ring 15 being arranged around the threaded portion of the clamping screw 8, and being located across the insert plate 10 from the actuating portion of the clamping screw 8. During the loosening of the clamping screw 8 from the tapped bore provided in the lower clamping member 7, the ring 15 lifts the insert plate 10, thus discontinuing the positive engagement of the corrugations 13. A gripping portion 16 is threadingly connected to the lower end of the lower clamping member 7, the portion 16 having a protective collar 17 at its end which is closer to the power tool 1.

As further illustrated in FIGS. 1 and 2, the power tool 1 is equipped with an arrangement for intercepting and withdrawing particulate material removed by the tool element 3 from a structure. As illustrated, such an arrangement is mounted on the auxiliary hand grip 4. The intercepting and withdrawing arrangement includes a cup-shaped intercepting member 18 which is elastically pressed against the structure during the operation of the power tool equipped with the dust-intercepting arrangement, the intercepting member or receptacle 18 having a through opening 19 for the tool element in the bottom wall thereof. In order to protect the intercepting receptacle 18 from excessive wear by the helical cutting edges of the tool element 3, an annulus 19' of hardened steel is incorporated in the bottom wall of the intercepting receptacle 18 around the opening 19, as particularly clearly illustrated in FIG. 2. Of course, the annulus 19' can be omitted in the simpler embodiments of the intercepting arrangement of the present invention. The through opening 19 is larger in diameter than the tool element 3.

The intercepting receptacle 18 is provided at its lower side with a connecting nipple 20 for a suction hose 21 which communicates the interior of the intercepting receptacle 18 with a non-illustrated conventional suction source. The suction hose 21 is held by a holding ring 22 which is affixed to the free end of the auxiliary hand grip 4.

The intercepting receptacle 18 is mounted on a cantilevered carrier or bracket 23 which, in turn, is attached to a mounting arrangement 24. The mounting arrangement 24 includes two basically tubular mounting members 25, 26. The mounting element 26 is telescopically received in the mounting element 25 and has a non-circular cross-section, particularly a cross-section having at least two corners. It is particularly advantageous for the inner mounting element 26 to have a hexagonal cross-section at its peripheral surface.

As illustrated in FIG. 3, the outer mounting element 25 has a guiding aperture 26 in which the inner mounting element 26 is received for longitudinal movement relative to the outer mounting element 25, but being retained against rotation about the common axis of the mounting elements 25, 26. The guide opening 27 is provided in a guide sleeve 28 which is accommodated in the cylindrical interior 29 of the outer mounting element 25.

The rear end of the outer mounting element 26, which is remote from the intercepting receptacle 18, is closed by a closure 30, the closure 30 having a guiding rod 31 mounted thereon in such a manner that the guiding rod 31 is coaxially received in the interior 29 of the outer mounting element 25. A helical compression spring 32 has one end which surrounds the outer periphery of the guiding rod 31, the other end of the compression spring 32 being snugly embraced by a tubular portion of the inner mounting member 26. The two ends of the helical compression spring 32 abut axially against the inner mounting element 26 and the closure 30 of the outer mounting element 25, respectively. In this manner, the maximum expansion space is made available for the compression spring 32 which is illustrated in FIG. 3 in its most expanded condition.

The outer mounting element 25 and the inner mounting element 26 abut against one another with abutment surfaces which are provided, on the one hand, at the inner side of the guiding sleeve 28 and, on the other hand, at a front end of a guiding ring 33 which faces the intercepting receptacle 18. The guiding ring 33 is affixed to the inner end of the inner mounting member 26 which is remote from the intercepting receptacle 18, and the outer diameter of the guiding ring 33 corresponds, except for a small play, to the inner diameter of the surface bounding the interior 29 of the outer mounting element 25.

A flat guiding surface 34 is provided on the otherwise cylindrical outer surface of the outer mounting element 25, as a result of which the cross-section of the outer mounting element 25 becomes non-circular. In this manner, the outer mounting element 25 is non-rotatably mounted in a receiving passage 35 of a slotted holding arrangement 37 which is equipped with a setting screw 36, as particularly seen in FIG. 5. The profiled rod 11, which extends parallel to the axis of the mounting elements 25, 26 and thus also parallel to the axis of the tool element 3, is mounted on the holding arrangement 37, the profiled rod 11 extending to both axial sides beyond the holding arrangement 37. Utilizing the profiled rod 11, the mounting arrangement 24 is so mounted on the power tool 1 or on the hand grip 4 that the profiled rod 11 is arrested in the through hole 9 of the auxiliary handgrip 4. Whether that end of the profiled rod 11 which extends beyond the front side, or that extending beyond the rear side, of the holding arrangement 37, is introduced into the through hole 9, depends on the construction and shape of the power tool 1, on the one hand, and on the length of the power tool 3, on the other hand. As may be ascertained from FIGS. 1, 2 and 4 of the drawing, the inner mounting element 26 is provided with an adjustment scale 38. The zero of this adjustment scale 38, which latter may be, for instance, metric, is located at the front face of the sleeve 28, and the adjustment scale 38 terminates at the cantilevered bracket 23 of the intercepting receptacle 18. A depth determining ring 40 is arranged at the outer circumference of the inner mounting element 25, carrying a setting screw 39 which is capable of arresting the depth-determining ring 40 in any selected position with respect to the inner mounting member 26 and thus along the scale 38. The depth-determining ring 40 has a passage therein the cross-sectional configuration of which corresponds to the outer contour of the inner mounting element 26. The depth-determining ring 40 has a slot 41 which is most particularly recognizable in FIG. 6 of the drawing.

In order to make the arrangement for intercepting and withdrawing particulate material especially handy and easy-to-operate, the outer mounting element 25, the holding arrangement 37, the depth-determining ring 40 and the intercepting receptacle 18 are made of a low-weight material, preferably a glass-fiber-filled polyamide. On the other hand, the inner mounting member 26 is made of a low-weight metal, particularly aluminum or an aluminum alloy. The inner mounting element 26 has been illustrated and described above as being of a hexagonal outer cross-section. However, it will be appreciated that the outer contour could also be different in cross-section, so long as the latter is not circular. As illustrated, the inner mounting member 26 is a body of a hexahedral stock material which has been hollowed in a material-removing procedure. However, it will be appreciated that tubular stock material of hexagonal shape could be used to advantage instead.

As may be easily ascertained from the drawings, the additional auxiliary hand grip 4 could be turned about the power tool 1, together with the above-discussed arrangement for intercepting and withdrawing the particulate material 9 through an angle of at least 200°, without any hindrance. This is particularly advantageous for the handling of the power tool 1 equipped with the dust-intercepting arrangement of the present invention, especially when the power tool is to be used for overhead drilling or for drilling in corner regions. The above-discussed manner of arranging the adjustment scale 38 brings about the advantage that always the actually achieved drilling depth can be read out at the front face of the sleeve 28, provided that the drilling dust intercepting arrangement is so arranged that the tip of the power tool 3 is flush with the front face of the intercepting receptacle 18 in the initial position, that is, the extended position of the mounting elements 25, 26, as illustrated in FIG. 2. When it is desired to switch from the use of a tool element 3 of one length to a tool element 3 of a different length, the position of the dust-intercepting arrangement with respect to the power tool can be so adjusted that the clamping screw 36 is loosened and the outer mounting element 25 is shifted in the passage 35 of the holding arrangement 37 until the situation illustrated in FIG. 2 is achieved, that is, until the tip of the tool element 3 is flush with the front face of the intercepting receptacle 18 in the extended position of the mounting elements 25, 26.

Now, when it is desired to use the power tool 1 in a drilling operation with the withdrawal of the particulate material dissociated by the tool element 3 from the structure, the suction hose 21 will, of course have to be communicated with a source of subatmospheric pressure such as, for instance, a suction blower. The above-described holding ring 22 which is arrestingly received in a coaxial bore of the gripping portion 16 of the auxiliary hand grip 4, avoids the possibility that the hose 21 and any components connected thereto could exert a one-sided pulling force on the intercepting member 18. When the aforementioned suction blower is in operation, air is drawn through the annular gap between the tool element 3 and the through hole 19 in the bottom hole 19 in the bottom wall of the intercepting member 18 into the discharge nipple 20 and into the suction hose 21. The advancing air entrains and transports the particulate material dissociated from the structure by the tool element 3 into and through the suction hose 21 toward and into a dust-collecting receptacle of the suction blower.

It is, of course, possible that, when the annular gap between the tool element 3 and the surface bounding the through hole 19 in the bottom wall of the intercepting member 18 has too large a cross-sectional flow-through area as related to the air-withdrawing capacity of the suction source, the rate of air flow within the intercepting member 18 will be too low for assuring a reliable removal of the particulate material from the interior of the intercepting receptacle 18. To avoid this disadvantageous possibility, it is further proposed by the present invention to construct the intercepting member as indicated at 48 in FIGS. 9 and 10. This intercepting member or receptacle 48 differs from that described previously in that an aperture plate 50 is mounted on the bottom wall of the intercepting receptacle 48 which faces toward the power tool 1, in sliding tracks 49. The aperture plate 50 has a through aperture 51 which has a smaller diameter than a through hole 52, corresponding to the above-discussed through hole 19, which is provided in the bottom wall of the intercepting receptacle 58. Thus, the aperture plate 50 can be located as illustrated, that is in its retracted position, in which it uncovers the through hole 52, for use with larger diameter tool elements 3, while the aperture plate 50 may be shifted in the tracks 49 into another position in which the aperture 51 is in a coaxial registry with the through hole 52, for use with smaller-diameter tool elements 3.

Of course, the arrangement of the present invention can also be used without the withdrawal of air with the entrained particulate material from the interior of the intercepting receptacle 18 and 48. Under these circumstances, the discharge nozzle 20 can be closed by a closure cap 53, as illustrated in FIG. 9. Under these circumstances the particulate material dissociated by the tool element 3 from the structure accumulates in the intercepting receptacle 18 or 48 and the accumulated contents of the intercepting receptacle 18 or 48 can be later emptied into an available waste container.

It will be understood that each of the elements described above, or two or more together, may also find a useful application in other types of constructions differing from the types described above.

While the invention has been illustrated and described as embodied in a particulate material intercepting arrangement for use in a hand-held power tool, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a hand-held power tool, a combination comprising a housing having a cylindrical extension;
an auxiliary handgrip having a body portion;
means for mounting said body portion on said housing, including two shell-shaped clamping members one of which is rigidly connected to said body portion and both of which together bound a passage for clampingly receiving said cylindrical extension of said housing, a pivot connecting said clamping members to each other at one side of said passage for relative pivoting between an open releasing position and a closed clamping position, and a clamping screw so connected to said clamping members at the opposite side of said passage as to displace said clamping members into said clamping position when being tightened;
a profiled rod; and
means for holding said profiled rod and said auxiliary handgrip in a plurality of positions, and wherein said clamping screw is also operative for operating said holding means at least in said clamping position of said clamping members for said holding means to arrest said profiled rod in the then assumed position thereof relative to said handgrip, said holding means including a through bore in one of said clamping members having a cross-sectional shape corresponding to that of said profiled rod, and a holding plate mounted on said clamping screw and penetrating into said through bore in said clamping position of said clamping members to reduce said cross-sectional shape of said through bore and thus clamp said profiled rod between the latter and itself, said profiled rod and said holding plate having mutually facing engagement surfaces provided with corrugations which engage each other in said clamping position of said clamping members.

2. A combination as defined in claim 1, wherein said profiled rod is a depth-determining rod; and wherein said holding means mounts said depth-determining rod on said handgrip for longitudinal displacement between said positions parallel to said extension of said housing.

3. A combination as defined in claim 1, wherein said one clamping member has a cutout for receiving said holding plate; wherein said holding plate has a central opening through which said clamping screw passes freely; and wherein the other clamping member has a tapped bore therein into which said clamping screw is threaded to draw said clamping members together during tightening thereof.

4. A combination as defined in claim 1, wherein said corrugations extend transversely of the direction of displacement of the profiled rod between said positions thereof.

5. A combination as defined in claim 1, wherein said body portion is at least partially of an insulating material and has a protective collar at an end thereof which is close to said housing.

6. In a hand-held power tool, a combination comprising a housing having a cylindrical extension;
an auxiliary handgrip having a body portion;
means for mounting said body portion on said housing, including two shell-shaped clamping members one of which is rigidly connected to said body portion and both of which together bound a passage for clampingly receiving said cylindrical extension of said housing, a pivot connecting said clamping member to each other at one side of said passage for relative pivoting between an open releasing position and a closed clamping position, and a clamping screw so connected to said clamping members at the opposite side of said passage as to displace said clamping members into said clamping position when being tightened;
a profiled rod;
means for holding said profiled rod and said auxiliary handgrip in a plurality of positions, and wherein said clamping screw is also operative for operating said holding means at least in said clamping position of said clamping members for said holding means to arrest said profiled rod in the then assumed position thereof relative to said handgrip, said holding means including a through bore in one of said clamping members having a cross-sectional shape corresponding to that of said profiled rod, and a holding plate mounted on said clamping screw and penetrating into said through bore in said clamping position of said clamping members to reduce said cross-sectional shape of said through bore and thus clamp said profiled rod between the latter and itself, said holding plate having an engagement surface which faces said profiled rod; and means for urging said holding plate away from said profiled rod, including an elastic ring interposed between said one clamping member and said engagement surface.

* * * * *